(12) United States Patent
Morin et al.

(10) Patent No.: US 9,909,683 B2
(45) Date of Patent: Mar. 6, 2018

(54) COMPACT-ACTUATOR GEAR SET

(75) Inventors: Jesse Morin, Westbrook, ME (US);
Tom West, Standish, ME (US); Alberto Dequarti, Mede (IT)

(73) Assignee: Cameron International Corporation, Houston, TX (US)

( * ) Notice: Subject to any disclaimer, the term of this patent is extended or adjusted under 35 U.S.C. 154(b) by 794 days.

(21) Appl. No.: 13/062,217

(22) PCT Filed: Mar. 24, 2010

(86) PCT No.: PCT/IB2010/051301
§ 371 (c)(1),
(2), (4) Date: Mar. 3, 2011

(87) PCT Pub. No.: WO2011/117678
PCT Pub. Date: Sep. 29, 2011

(65) Prior Publication Data
US 2011/0232405 A1 Sep. 29, 2011

(51) Int. Cl.
*F16K 31/54* (2006.01)
*F16H 55/26* (2006.01)

(52) U.S. Cl.
CPC .......... *F16K 31/54* (2013.01); *F16H 55/26* (2013.01); *Y10T 74/19665* (2015.01)

(58) Field of Classification Search
CPC ..... F16K 31/54; F16H 55/26; Y10T 74/19665
USPC ....... 251/248, 250, 249.5; 74/425, 423, 437; 475/336, 343
See application file for complete search history.

(56) References Cited

U.S. PATENT DOCUMENTS

| | | | | |
|---|---|---|---|---|
| 798,847 A * | 9/1905 | Voss | ................................... | 74/78 |
| 1,459,650 A * | 6/1923 | Burnett | ........................... | 74/508 |
| 2,973,658 A * | 3/1961 | Bishop | ............................ | 91/382 |
| 3,777,580 A * | 12/1973 | Brems | ............................ | 74/110 |
| 3,986,408 A * | 10/1976 | Takahashi et al. | ............. | 74/499 |
| 4,582,334 A * | 4/1986 | Tashiro et al. | ................ | 180/410 |
| 4,763,385 A * | 8/1988 | Furch et al. | ...................... | 16/58 |
| 5,018,469 A * | 5/1991 | Carlson | .................... | 114/144 R |
| 6,347,782 B1 * | 2/2002 | Gill | ................................ | 251/58 |
| 6,766,709 B1 | 6/2004 | West et al. | | |

(Continued)

FOREIGN PATENT DOCUMENTS

| EP | 0313182 | 4/1989 |
|---|---|---|
| JP | 2003148583 | 5/2003 |

(Continued)

OTHER PUBLICATIONS

PCT Search Report and Written Opinion of PCT Application No. PCT/IB2010/051301 dated Jun. 2, 2010.

(Continued)

*Primary Examiner* — Marina Tietjen
(74) *Attorney, Agent, or Firm* — Fletcher Yoder, P.C.

(57) ABSTRACT

A gearbox assembly for an actuator is provided. The gearbox assembly includes a rack, a spur pinion, a bevel pinion, and a bevel gear. Vertical translation of the rack causes rotation of the spur pinion and bevel pinion around a horizontal axis. The rotation of the bevel pinion causes rotation of the bevel gear around a vertical axis. The gearbox assembly may be coupled to a movable member of a valve so that actuation of the gearbox assembly moves the movable member. Systems including the gearbox assembly and methods of operation are also disclosed.

26 Claims, 10 Drawing Sheets

(56) References Cited

U.S. PATENT DOCUMENTS

| | | |
|---|---|---|
| 6,997,437 B2 * | 2/2006 | Mitten .................... 251/214 |
| 2004/0074145 A1 * | 4/2004 | Homberg ...................... 49/64 |
| 2004/0134665 A1 | 7/2004 | Greeb et al. |
| 2008/0257085 A1 * | 10/2008 | Bless et al. ............. 74/421 R |

FOREIGN PATENT DOCUMENTS

| | | |
|---|---|---|
| WO | WO9417318 | 8/1994 |
| WO | 2006/079492 A1 | 8/2006 |

OTHER PUBLICATIONS

CA Examination Search Report; Application No. CA 2,791,761; dated Dec. 16, 2016; 5 pages.
EP Communication Pursuant to Article 94(3) EPC; Application No. EP 10714480.0; dated Sep. 13, 2013; 6 pages.
KR Office Action and English Translation; Application No. KR 10-2012-7024619; dated May 13, 2016; 8 pages.

* cited by examiner

COMPACT-ACTUATOR GEAR SET

CROSS-REFERENCE TO RELATED APPLICATION

This application claims priority to and benefit of PCT Patent Application No. PCT/IB2010/051301, entitled "Compact-Actuator Gear Set," filed Mar. 24, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas are fluids that have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

The flow of fluid, whether petroleum-based or otherwise, can be controlled with valves. Fluid flows through a valve in an open configuration, but that flow can be interrupted by transitioning the valve to a closed configuration. While many valves are manually actuated between the open and closed configurations, more-robust valves found in industrial settings are typically actuated mechanically by an hydraulic, electric, or pneumatic actuator, for example.

In certain instances, the mechanical actuator provides a motive force in a direction that is different from what is required to actuate the valve. For example, a linear actuator may not be well suited to turn a ball valve. To translate linear movement into rotational movement, for example, a gear set may be interposed between the actuator and the valve. The gear set receives the actuator's motive-force output, changes the direction of that output, and then provides a motive-force input for the valve, thereby actuating the valve.

Gear sets extract a price: efficiency. Rather than all of actuator's output energy going toward actuation of the valve, the gear set consumes some of that energy. Less-efficient gear sets generally require a larger, more-powerful actuator than necessary if the valve were directly coupled to the actuator. The interposed gearbox thus adds to the cost, weight, and size of the required actuator. Further, for large valves or valves requiring large amounts of actuation torque, the actuator and related gear sets may be too large and require too much space for easy install and use.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include a gear set that can be used in a compact actuator. The exemplary gear set is believe to efficiently translate the linear movement of a device in one plane to rotational movement in a non-parallel plane. For example, the gear set can translate linear actuation in a vertical plane into rotational movement in a horizontal plane. This translation can be effectuated by a rack-and-pinion gear arrangement coupled to a bevel-gear arrangement. The rack-and-pinion assembly translates linear motion into rotational motion. And the bevel-gear arrangement, which rotates with the pinion gear, translates the pinion's rotational motion from a vertical plane to a horizontal plane. The bevel-gear arrangement may be coupled to the shaft of a quarter-turn ball valve, causing the ball valve to transition between open and closed configurations and, as such, controlling the flow of fluid through the valve.

Figure 1:
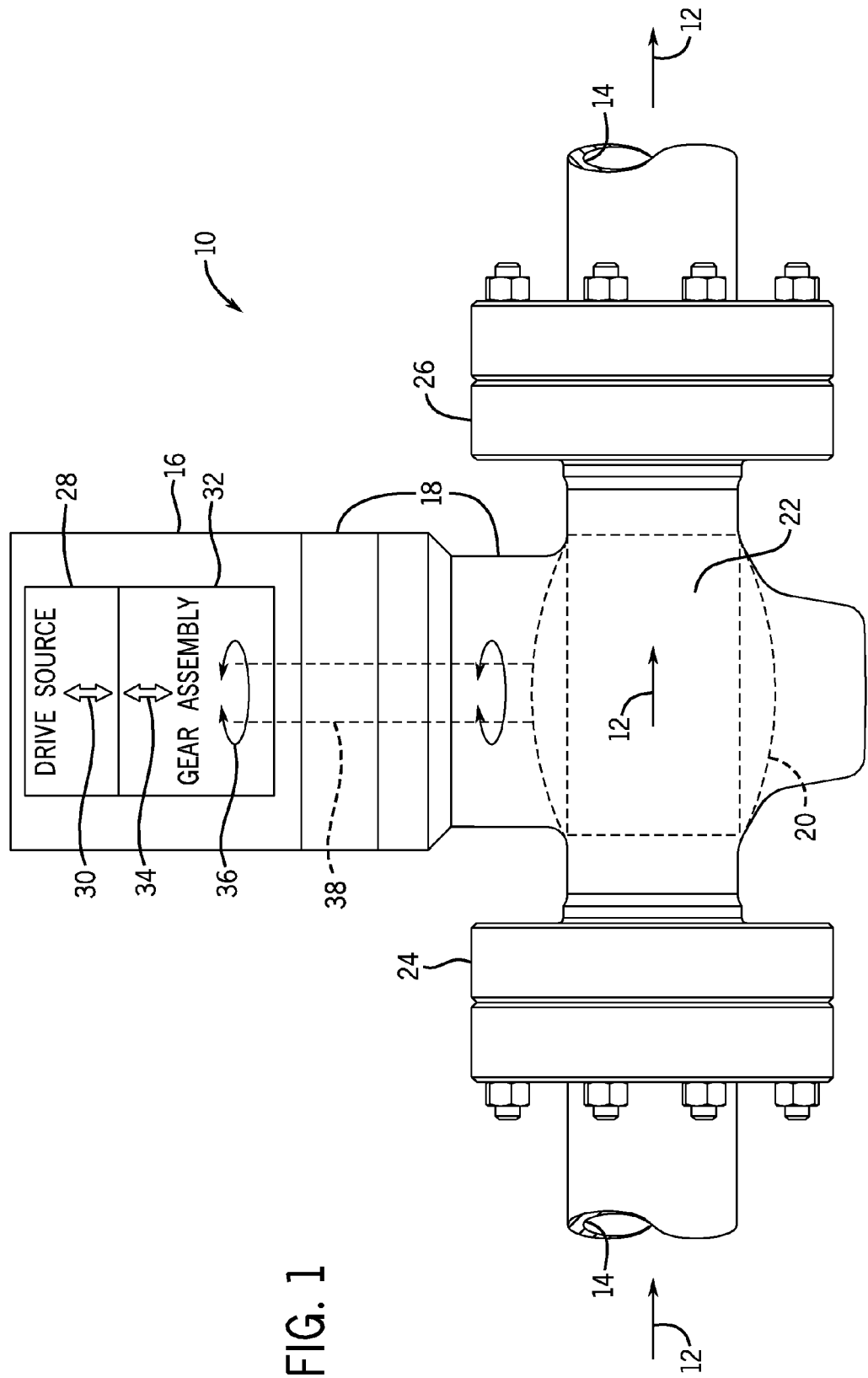
FIG. 1 is a diagrammatic illustration of a valve assembly having an actuator, in accordance with an embodiment of the present invention.

FIG. 1 is a diagrammatic illustration of a valve assembly 10 for controlling the flow 12 of a fluid through a flow path 14. The exemplary valve assembly 10 comprises an actuator 16 that is coupled to a valve body 18. The valve body may support any number of valve types, examples of which are butterfly valves, ball valves, quarter-turn valves, gate valves, to name but a few. As illustrated, the valve body 18 carries a ball valve 20. In the open configuration, the through bore 22 of the ball valve 20 is aligned with the inlet 24 and outlet 26 of the valve assembly 10. This allows the flow 12 to pass through the valve. The flow 12 can be interrupted by turning the ball valve 20 to place the through bore 22 perpendicular to the inlet 24 and outlet 26. In other words, a quarter-turn of the ball valve 20 transitions the valve assembly 10 between open and closed configurations.

To effectuate this quarter-turn, the actuator 16 provides a motive force through a drive source 28. The drive source 28 may be one of any number of suitable devices, such as an hydraulic actuator, an electric and linear motor, a pneumatic device or a manual wheel, to name a few. In the illustrated embodiment, the drive source 28 provides linear motion, as represented by the bi-directional arrow 30. However, this linear motion 30 cannot directly actuate the ball valve 20, which must be rotated (e.g., quarter-turned).

A gear assembly 32 coupled to the drive source 28 translates the drive source's 28 linear motion into the desired rotational motion. Specifically, the gear assembly 32 receives the linear motive input 34 of the drive source 28 and translates that input into a rotational motive output 36. Moreover, the gear assembly translates the linear input 34 into a rotational output that travels in a plane not parallel with that of the linear input. That is, the drive source's vertical and linear motion is translated into horizontal and rotational motion, for example. A valve stem 38 attached to the ball valve 20 may be coupled to the output of the gear assembly 32. The stem 38 may be fixed to the ball valve; thus torque on the stem 38 is transferred to the ball valve 20, and rotation of the stem 38 causes rotation of the ball valve 20. Accordingly, the rotational output 36 of the gear assembly 32 effects rotation of the stem 38 and the ball valve 20. And viewing the valve assembly 10 as a whole, the linear motion 30 of the drive source 28 can be used to rotate the ball valve 20 and transition the valve assembly 10 between the open and closed configurations to control the flow 12 through the flow path 14. The valve assembly 10 may be used in an on/off manner to allow or restrict flow from upstream components to downstream components along the flow path 14.

It should be appreciated that the valve 10 may be bi-directional, and the terms "inlet", "outlet," "upstream," and "downstream" are used for ease of reference and do not describe any specific directional limitation of the valve 10. Moreover, the use of the adjectival or adverbial modifiers "horizontal" and "vertical," "upwardly" and "downwardly," or "clockwise" and "counter-clockwise" are also only used for ease of relative reference between the sets of terms and do not describe any specific directional limitation on the modified term.

Figure 2:
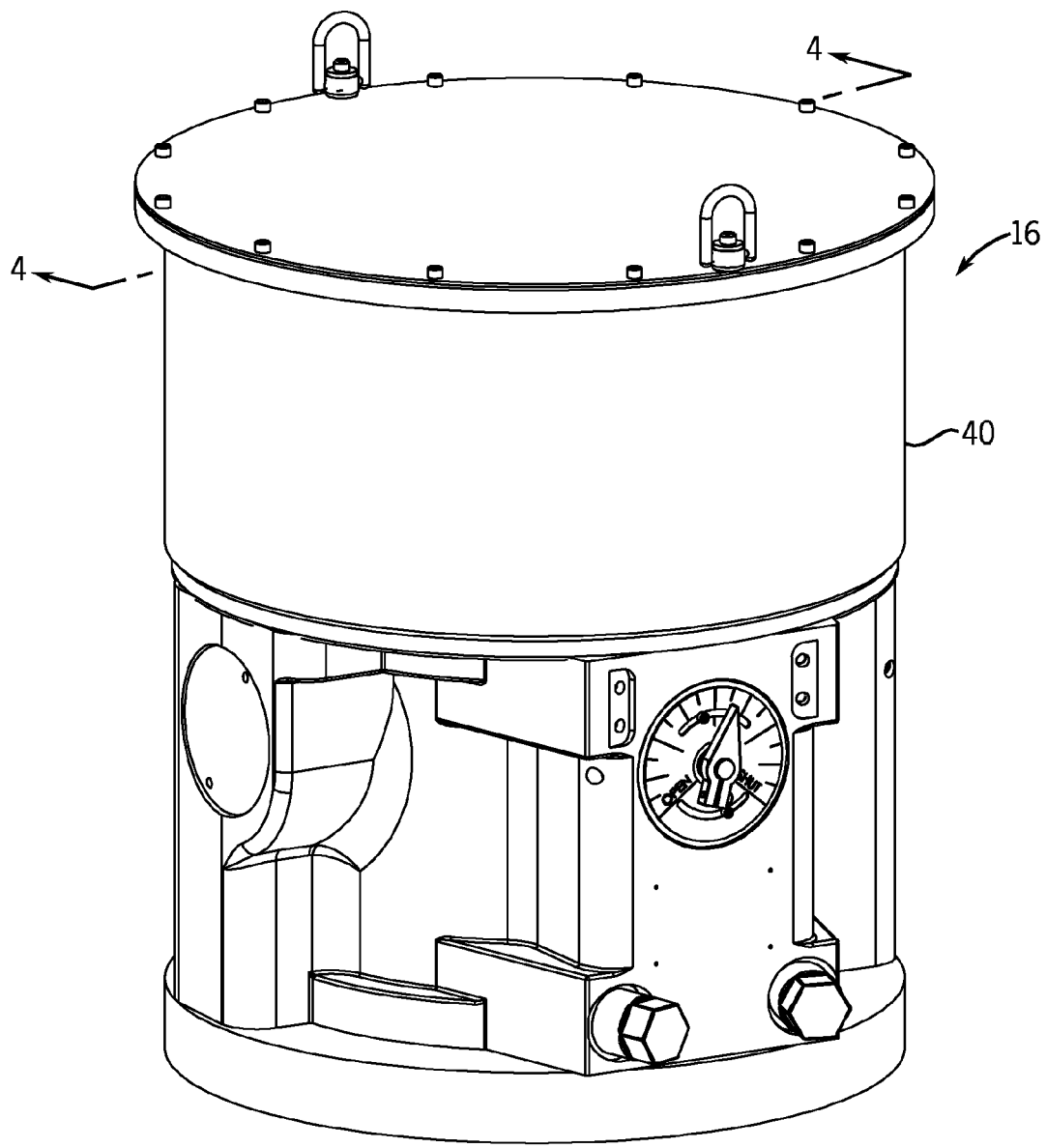
FIG. 2 is an isometric illustration of an actuator, in accordance with an embodiment of the present invention.

FIG. 2 illustrates an exemplary compact actuator 16. The depicted actuator 16 has a housing 40 that supports both the drive source 28 and the gear assembly 32, which are illustrated in FIG. 1. By combining these two components in one housing, the overall size of the actuator 16 may be reduced. However, it is also envisaged that the drive source 28 and the gear assembly 32 may be separate components, each having its own housing. Thus, the gear assembly 32 may be mated with any number of drive sources 28 that may be changed, or vice versa, as the needs of the valve assembly 10 change, for example. The actuator 16 may include a flanged portion (not shown) to facilitate attachment of the actuator 16 the valve body 18 (FIG. 1). Similarly, if the drive source 28 and gear assembly 32 have separate housings, each of these housings may include flanged connections to facilitate assembly.

Figure 3:
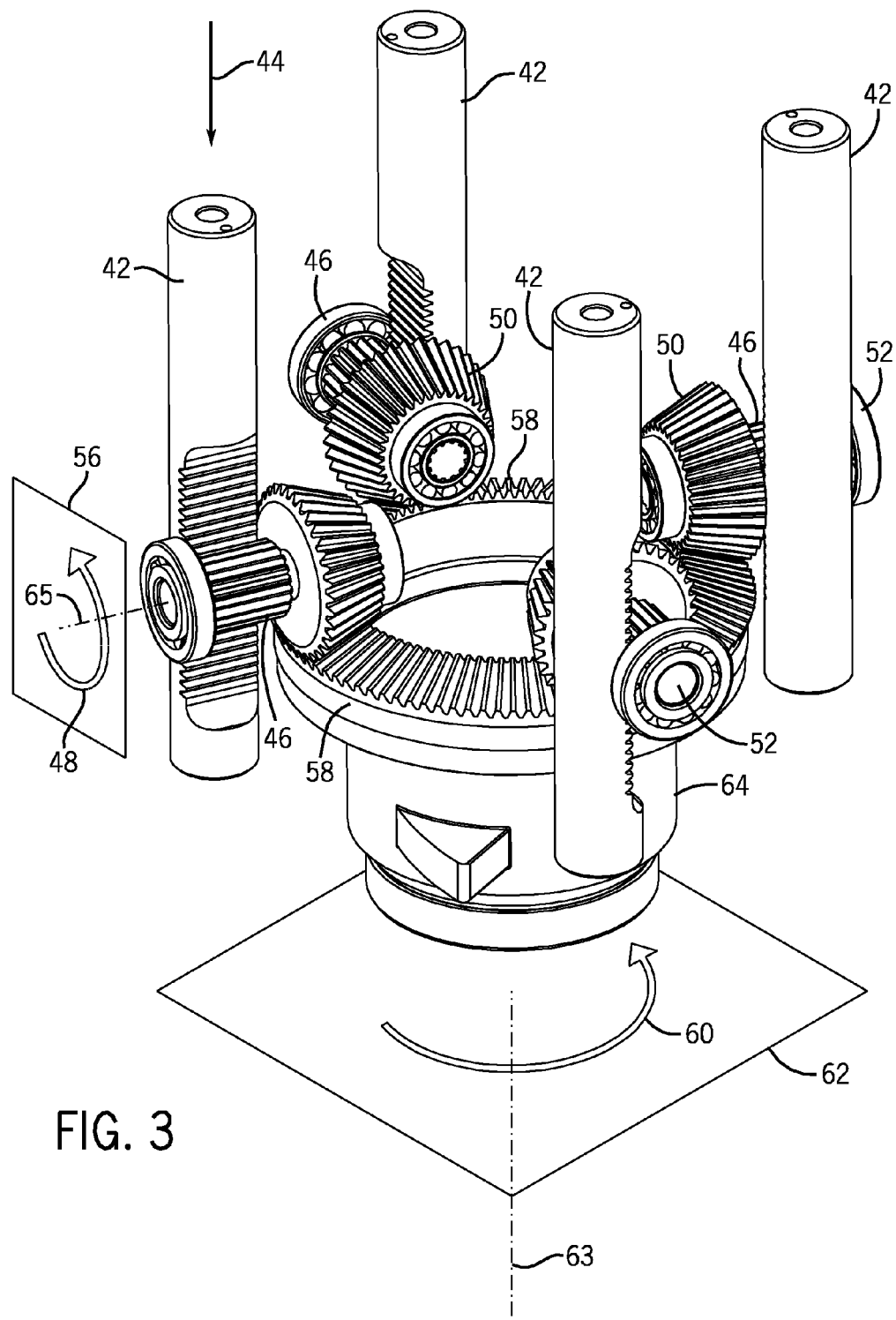
FIG. 3 is a perspective view of a gear set for a compact actuator, in accordance with an embodiment of the present invention

FIG. 3 is a perspective view of an exemplary gear set 32. The gear set 32 includes a plurality of rack gears 42. The racks 42 are configured to receive the linear motive input from the drive source 28 (FIG. 1). If the motive input is downwardly, as represented by arrow 44, the rack 42 moves downwardly. Each rack 42 engages with a spur pinion gear 46, and downward movement of the rack 42 causes rotation (arrow 48) of the spur pinion 46. The rack 42 and spur pinion 46 cooperate to translate linear motion into rotational motion. However, the linear and rotational motion are generally parallel to one another. That is, the linear motion 44 is generally parallel to the plane 56 in which the rotational motion 48 occurs.

The illustrated spur pinion 46 is mounted on the same shaft 52 as a bevel pinion gear 50. Thus, the spur pinion 46 the bevel pinion 50 rotate together and in the same direction (arrow 48). The bevel pinion 50 engages with an output bevel gear 58, and causes the output bevel 58 to rotate in the direction of arrow 60. Of note, the rotation of the output bevel 58 is in a plane 62 generally perpendicular to that of the bevel pinion 50, i.e., plane 56. That is, the axis of rotation 63 of the output bevel 58 is parallel with the direction of the linear motion 44, but perpendicular to the axis of rotation 65 of the spur pinion 46 and the bevel pinion 50. It is believed that the gear set 32 efficiently translates linear motion to a non-parallel rotational motion. Advantageously, it is believed that this gear assembly 32 may provide up to 90% efficiency or greater. For example, the gear 32 may provide an efficiency of at least greater than approximately 50, 60, 70, 90, or 90%. Thus, as compared to conventional gear sets, less linear load may be used to effect rotational movement. In turn, the size and power of the drive source can be reduced.

The output bevel 58 may be bolted to a carrier 64 that is configured to couple with the component to be moved. For example, the illustrated carrier 64 rotates in the direction of output bevel 58 (arrow 60) and includes a receiving portion 66 (FIGS. 4 and 5) that is designed to receive the valve stem 38. Thus, rotation of the output bevel 58 causes rotation of the carrier 64 that, in turn, causes rotation of the valve stem 38 and, ultimately, rotation of the ball valve 20. Depending on the torque requirements for turning the ball valve, any number of rack, spur pinion, and bevel pinion gear sets may be coupled to the single output bevel gear. As illustrated, there are four such gear sets coupled to the output bevel. However, as few a one or as many as can fit around the circumference of the output bevel may be provided. Moreover, it is also envisaged that the gear assemblies 32 described herein provide efficiency benefits when used in reverse, wherein a rotational input can be efficiently translated into a linear output.

Figure 4:
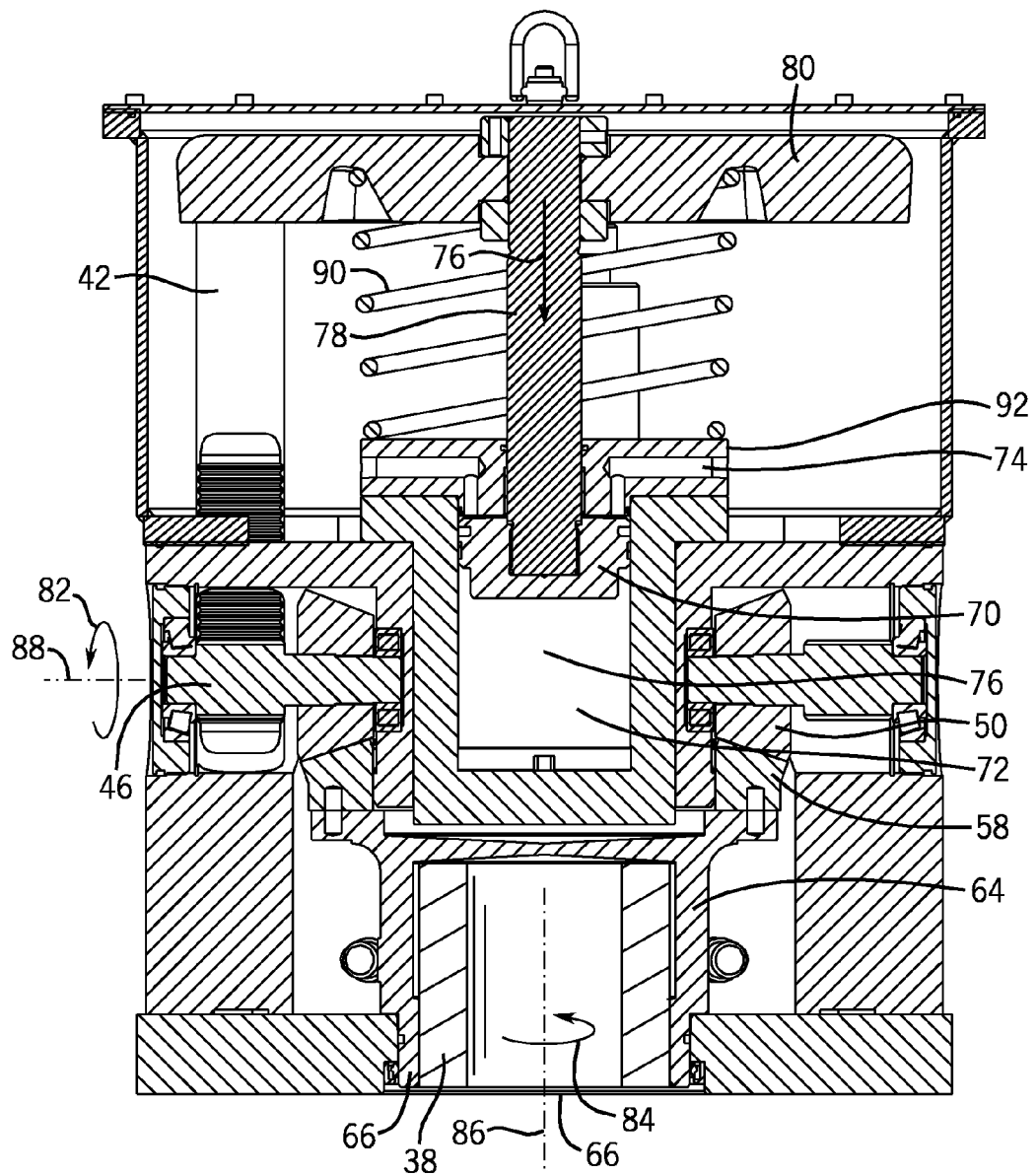
FIGS. 4 and 5 are simplified cross-sections of the actuator of FIG. 2 taken across line A-A of FIG. 2, wherein the illustrated actuator is in different operating configurations.
Figure 5:
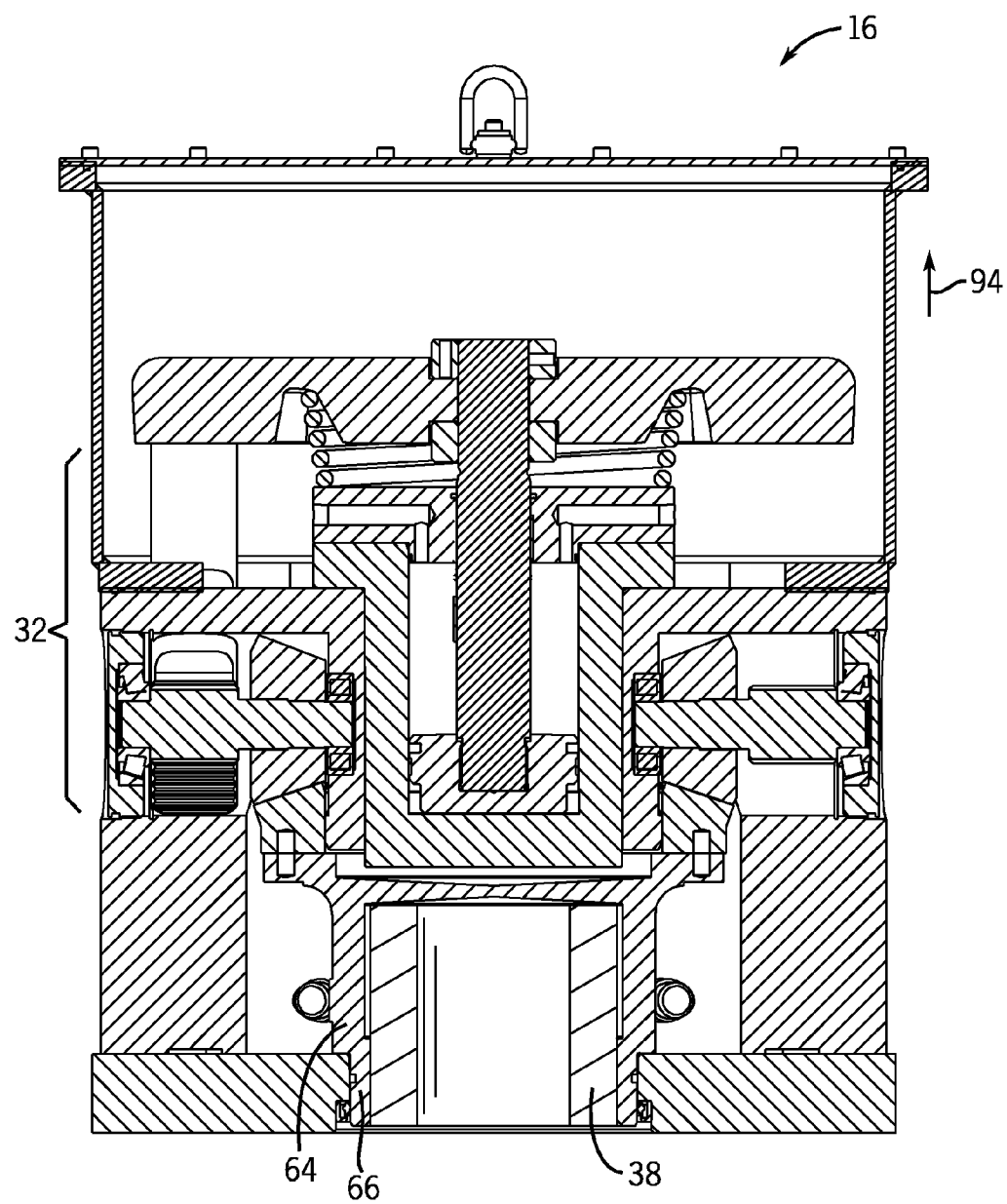

FIGS. 4 and 5 are simplified cross-sectional representations of the hydraulic compact actuator 16 introduced in FIG. 2. The actuator 16 includes a piston 70 that seals against cylinder 72. When hydraulic fluid is inserted through inlet 74, the piston is driven downwardly (arrows 76). The piston 72 is coupled to a piston stem 78, which moves in the same direction as, and with, the piston 72. The piston stem 78 is coupled to a top plate 80 that moves in conjunction with the piston 72 and the piston stem 78, and, as such, in the same direction 76. The rack 42 of the gear set 32 is coupled to the top plate 80. Accordingly, downward movement 76 of the top plate 80 drives the rack 42 downwardly. Thus, by introducing hydraulic fluid, the top plate 80 moves and provides a motive force to the gear set 32 to actuate the rack 42.

As discussed above, downward movement of the rack 42, causes rotation of the spur pinion 46 and bevel pinion 50 in the direction of arrow 82. This rotation 82, in turn, causes output bevel 58, carrier 64, and the valve stem 38 coupled to the receiving portion 66 of the carrier 64 to rotate in the direction of arrow 85. Again, the axis of rotation 86 of the stem 38 is non-parallel to the axis of rotation 88 of the spur pinion 46 and parallel with the direction of the linear motion 76.

The actuator 16 may include a "fail-safe" feature, such as a spring 90. The exemplary spring 90 is disposed between the moveable top plate 80 and the fixed base plate 92. The spring biases against downward movement 76 of the top plate 80. Thus, if hydraulic fluid is introduced to transition the actuator from the configuration of FIG. 4 to that of FIG. 5, the spring 90 of the actuator would act to drive the top plate upwardly 94 in the event hydraulic pressure is lost. If the configuration illustrated in FIG. 4 is calibrated to the open configuration of the valve, and FIG. 5 is calibrated to the closed configuration of the valve, then the actuator would be a "fail-safe-open" actuator. Conversely, if the configuration illustrated in FIG. 4 is calibrated to the closed configuration of the valve, and FIG. 5 is calibrated to the open configuration of the valve, then the actuator would be a "fail-safe-closed" actuator.

Figure 6:
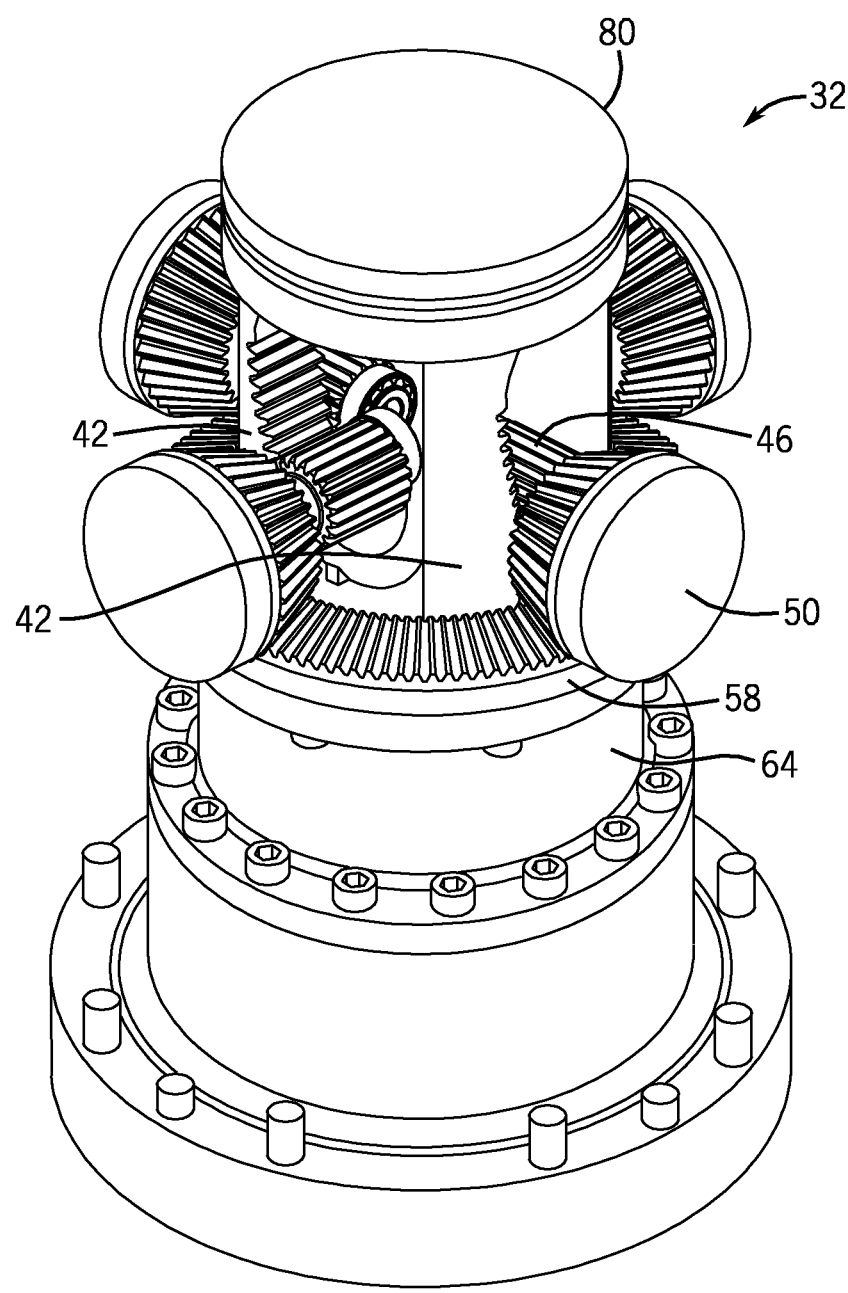
FIG. 6 is a perspective view of a gear set for a compact actuator, in accordance with an embodiment of the present invention.

FIG. 6 illustrates and alternate embodiment of a gear set assembly 32. In this embodiment, the spur pinions 46 are located radially inward of the output bevel 58. This provides a more compact arrangement for the gear set 32. The gear set 32 of FIG. 6 operates in a manner similar to that described above. The top plate 80 may be coupled to any number of suitable drive sources 28, examples of which, as discussed above, included electric motors, hydraulic motors, manually-operated devices, to name but a few. Moreover, depending on the drive source used, it may be advantageous to have the illustrated gear set 32 receive its motive input from another gear set rather than directly from the drive source 28.

Figure 7:
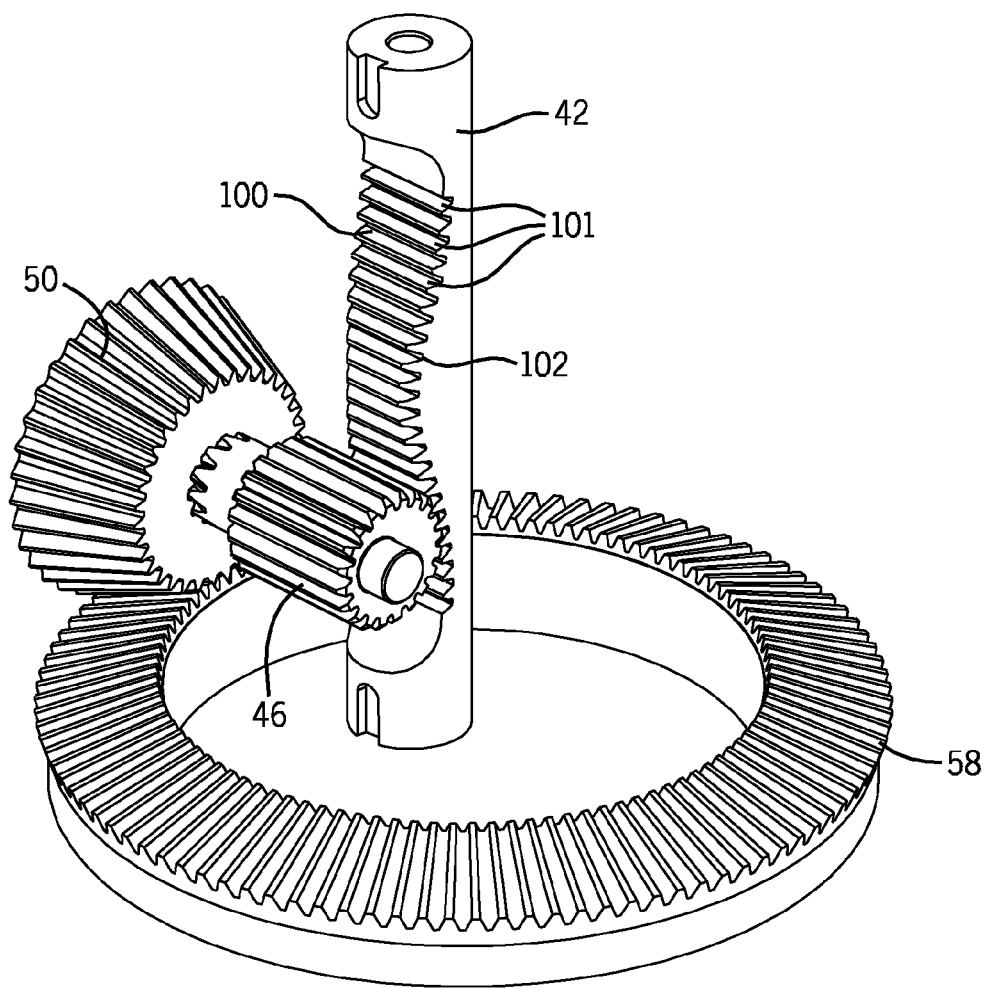
FIG. 7 is a perspective view of a gear set, in accordance with an embodiment of the present invention.

FIG. 7 is a perspective and detail view of components of the gear set 32 introduced in FIG. 6. In this embodiment, the spur pinion 46 rotates in an eccentric manner. Specifically, the center axis of the spur pinion 46 is offset from the axis of rotation of the spur pinion 46 and bevel pinion 50. Thus, the spur pinion 46 is not concentric with the bevel pinion 50. To accommodate the eccentric nature of the spur pinion 46, the rack gear's 42 teeth are disposed on arcuate surfaces 102, rather than on a straight surface as is illustrated in FIG. 3, for example. Advantageously, the radius of curvature of the arcuate surfaces 102 and the eccentricity of the spur pinion 46 can be manipulated to produce a conjugate curve that provides the desired torque on the pinion bevel 50 as best suited to operation of the ball valve 20, other whatever device is being actuated. For example, the radius of curvature may have a sinusoidal profile or may have parabolic features, as is desired to provide the appropriate torque.

Figure 8:
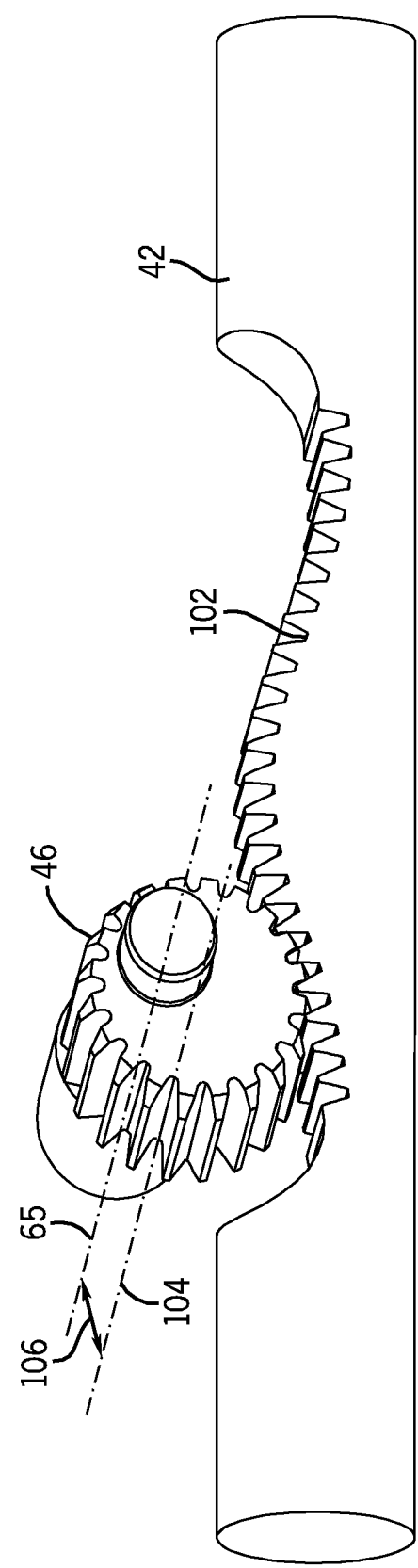
FIG. 8 is a perspective view of components of the gear set illustrated in FIG. 7.
Figure 9:
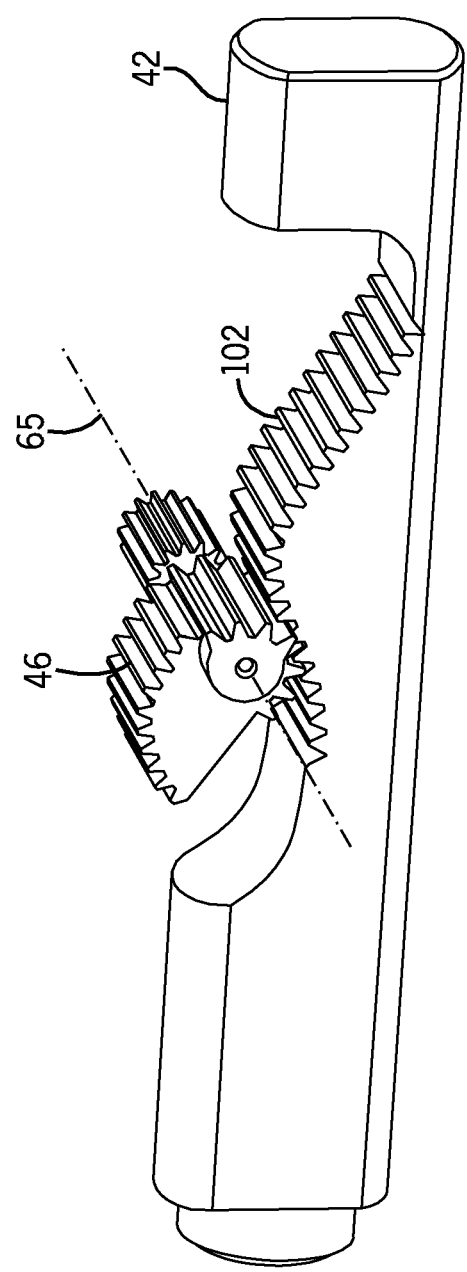
FIG. 9 is a perspective view of a gear set, in accordance with an embodiment of the present invention.

FIG. 8 is a perspective view of a rack 42 mated with an eccentric spur pinion 46. As illustrated, the axis of rotation 65 of the spur pinion 46 is offset with respect to the center axis 104 of the spur pinion 46 by a distance 106. Similar to FIG. 8, FIG. 9 is a perspective view of a different embodiment of a rack gear 42 and spur pinion gear 46 arrangement. In this embodiment, the radius of curvature of the arcuate surface 102 varies. The spur pinion 46 is pie-shaped to accommodate the arcuate surface 102. The tooth profile of the various gears described above may also be manipulated to provided the desired torque characteristics. For example, the above-described gears are illustrated with straight teeth; however, the benefits of the present invention are also applicable to helical or spiral teeth, for example.

Figure 10:
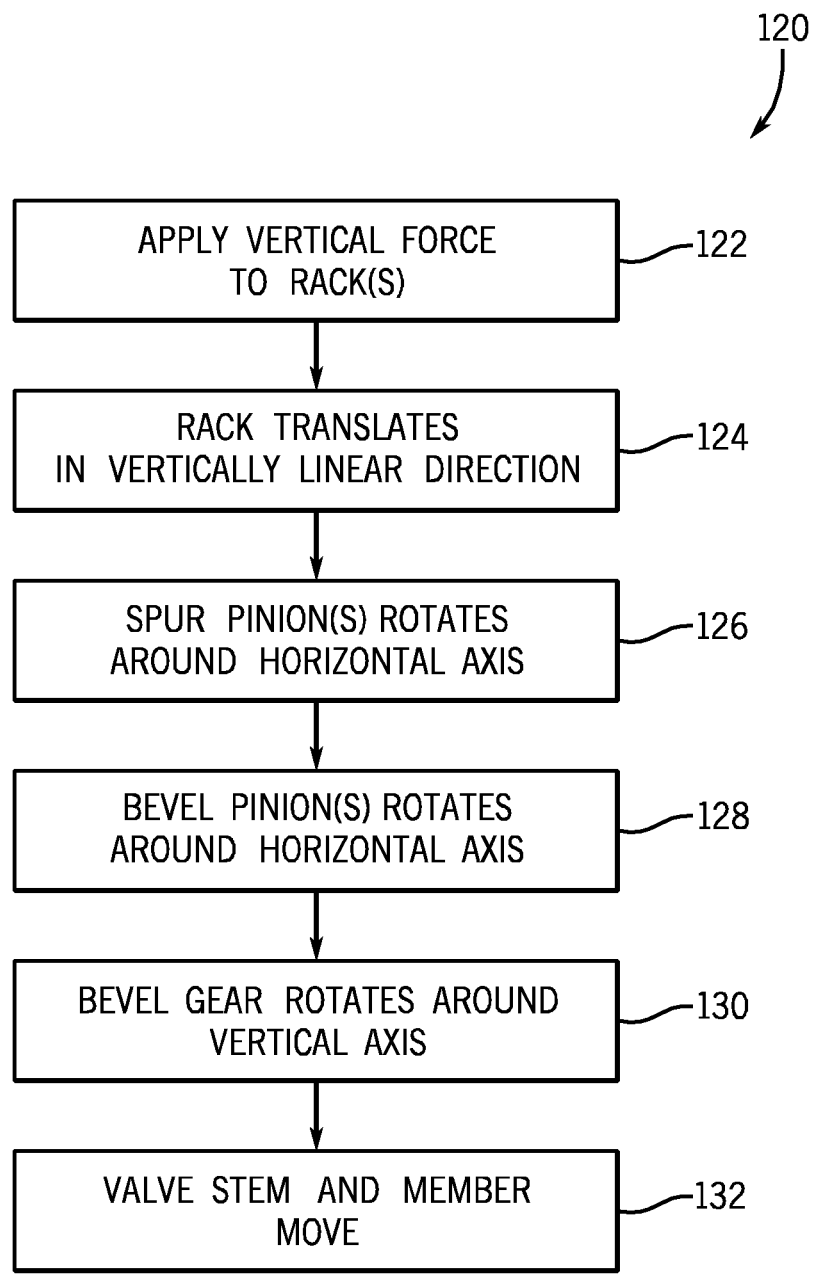
FIG. 10 is a flowchart diagramming the actuation of a gear set in accordance with an embodiment of the present invention.

FIG. 10 depicts a process 120 of operation of the valve assembly 10 in accordance with an embodiment of the present invention. As described above, initially a vertical force may be applied (block 122), either directly or indirectly, to the rack 42 of the assembly 10 (or multiple racks, such as shown in FIG. 6). The rack 42 may translate in a vertically linear direction (block 124). The translation of the rack 42 causes rotation of the spur pinion 46 around horizontal axis 65 (block 126). The rotation of the spur pinion 46 causes rotation of the bevel pinion 50 around the same horizontal axis 65 (block 128). As the bevel pinion 50 rotates, the engagement with the output bevel 58 causes the output bevel 58 to rotate around the vertical axis 63 (block 130), e.g., in a horizontal rotary motion. The rotation of the output bevel 58 then causes movement, e.g., rotation, of a valve stem 38 and valve member 20 to open or close the valve 10 (block 132).

While the invention may be susceptible to various modifications and alternative forms, specific embodiments have been shown by way of example in the drawings and have been described in detail herein. However, it should be understood that the invention is not intended to be limited to the particular forms disclosed. The above-described invention is applicable to any number of industries, beyond valves and valve operation. The described gear set is envisaged to provide benefits to any number of situations where efficient translation of motion is desired. As an example, the present invention can provide benefits to any number of oilfield devices, such as production trees, operating valves, blowout preventors, drilling equipment, downhole valves, to name a few. Accordingly, the invention is to cover all modifications, equivalents, and alternatives falling within the spirit and scope of the invention as defined by the following appended claims.

The invention claimed is:

1. A system, comprising:
  a gearbox assembly, comprising:
    a rack comprising first teeth arranged along a curved profile along a length of the rack;
    a first pinion comprising second teeth engaged with the first teeth of the rack, wherein the second teeth are configured to rotate around a first axis, the second teeth are disposed along an eccentric profile about the first axis, and a torque curve of the gearbox assembly is selected entirely based on the curved profile and the eccentric profile;
    a second pinion coupled to the first pinion by a shaft and configured to rotate around the first axis;
    a bevel gear coupled to the second pinion and configured to rotate around a second axis perpendicular to the first axis;
    wherein the bevel gear rotates around the second axis in response to translation of the rack.

2. The system of claim 1, wherein the rack is configured to translate along a linear direction along the second axis, and the curved profile continuously curves along the length having the first teeth.

3. The system of claim 1, wherein the curved profile varies in height along the length of the rack from a first base to a peak and from the peak to a second base, the curved profile curves from the first base to the peak, and the curved profile curves from the peak to the second base.

4. The system of claim 3, wherein the peak is centrally positioned along the length of the curved profile.

5. The system of claim 1, wherein the second pinion comprises third teeth and the bevel gear comprises fourth teeth, wherein the second pinion is coupled to the bevel gear by engagement of the fourth teeth with the third teeth.

6. The system of claim 1, wherein the curved profile varies in height along the length of the rack and has only one peak.

7. The system of claim 1, wherein the rack is disposed radially inward of the bevel gear in a radial inward direction relative to the second axis.

8. The system of claim 1, comprising an actuator coupled to the gearbox assembly, wherein the actuator moves the rack in a linear direction.

9. The system of claim 1, comprising a valve coupled to the gearbox assembly, wherein the gearbox assembly moves a moveable member of the valve.

10. The system of claim 1, wherein the gearbox assembly comprises a plurality of rack and pinion assemblies, wherein each assembly of the plurality of rack and pinion assemblies comprises a separate set of the rack, the first pinion, and the second pinion, wherein the bevel gear is engaged with the second pinion of each assembly of the plurality of rack and pinion assemblies.

11. The system of claim 10, wherein each rack of the plurality of rack and pinion assemblies is disposed radially inward of the bevel gear.

12. The system of claim 10, wherein the plurality of rack and pinion assemblies comprise four rack and pinion assemblies engaged with the bevel gear.

13. The system of claim 10, wherein each rack of the plurality of rack and pinion assemblies is coupled to a shared piston, wherein movement of the piston causes translation of each rack of the plurality of rack and pinion assemblies.

14. The system of claim 1, wherein the gearbox assembly comprises an actuator configured to drive the rack in a first direction and a failsafe feature configured to bias the rack in a second direction opposite from the first direction.

15. A system, comprising:
a valve comprising a movable member;
a gearbox coupled to the valve and configured to move the movable member between a first position and a second position, wherein the gearbox comprises:
a rack having first teeth engaged with second teeth of a first pinion, wherein the first teeth are arranged along a curved profile along a length of the rack, the curved profile curves across a central portion of the length having the first teeth, the second teeth are arranged along a variable profile about a first axis of the first pinion, the variable profile has a variable distance relative to the first axis, and a torque curve of the gearbox is selected based on the curved profile and the variable profile; and
a bevel gear coupled to the first pinion,
wherein the gearbox is configured to convert translation of the rack into rotary motion of the bevel gear.

16. The system of claim 15, wherein the bevel gear is coupled to the first pinion by engagement with a second pinion, the second pinion is coupled to the first pinion by a shaft, and the first pinion and second pinion rotate around the first axis in response to linear movement of the rack.

17. The system of claim 15, wherein the rack is disposed radially inward of the bevel gear in a radial inward direction relative to a second axis of rotation of the bevel gear.

18. The system of claim 17, wherein the gearbox comprises a plurality of racks, including the rack, disposed radially inward of the bevel gear.

19. The system of claim 15, wherein the central portion of the length has a peak, the curved profile varies in height along the length of the rack from a first base to the peak and from the peak to a second base, the curved profile curves from the first base to the peak, and the curved profile curves from the peak to the second base.

20. The system of claim 19, wherein the peak is centrally positioned along the length of the curved profile.

21. The system of claim 15, wherein the curved profile continuously curves along the length having the first teeth.

22. The system of claim 15, wherein the torque curve of the gearbox is selected entirely based on the curved profile and the variable profile.

23. A system, comprising:
an actuator gearbox, comprising:
a bevel gear disposed and configured to rotate around a first axis;
a plurality of rack and pinion assemblies, wherein each rack and pinion assembly of the plurality of rack and pinion assemblies comprises:
a rack comprising first teeth arranged along a curved profile along a length of the rack, wherein the curved profile has a variable curvature along the length of the rack, and the rack is disposed radially inward of the bevel gear in a radial inward direction relative to the first axis;
a first pinion coupled to the rack and configured to rotate around a second axis in response to translation of the rack;
a second pinion coupled to the first pinion and configured to rotate around the second axis with the first pinion;
wherein the second pinion of each rack and pinion assembly is coupled to the bevel gear such that the bevel gear rotates around the first axis in response to the rotation of each of the second pinions around the second axis.

24. The system of claim 23, wherein each rack of the plurality of rack and pinion assemblies is coupled to a shared piston, wherein movement of the piston causes translation of each rack of the plurality of rack and pinion assemblies.

25. The system of claim 23, wherein the piston is coupled to a source of hydraulic pressure.

26. The system of claim 23, wherein a torque curve of the actuator gearbox is selected based on the curved profile.

* * * * *